Oct. 23, 1951 W. M. HUSTON 2,572,029
LOAD HANDLING MACHINE
Filed July 5, 1945 11 Sheets-Sheet 1

INVENTOR
William M. Huston
BY
ATTORNEYS

Oct. 23, 1951  W. M. HUSTON  2,572,029
LOAD HANDLING MACHINE
Filed July 5, 1945  11 Sheets-Sheet 2

INVENTOR
William M. Huston
BY
ATTORNEYS

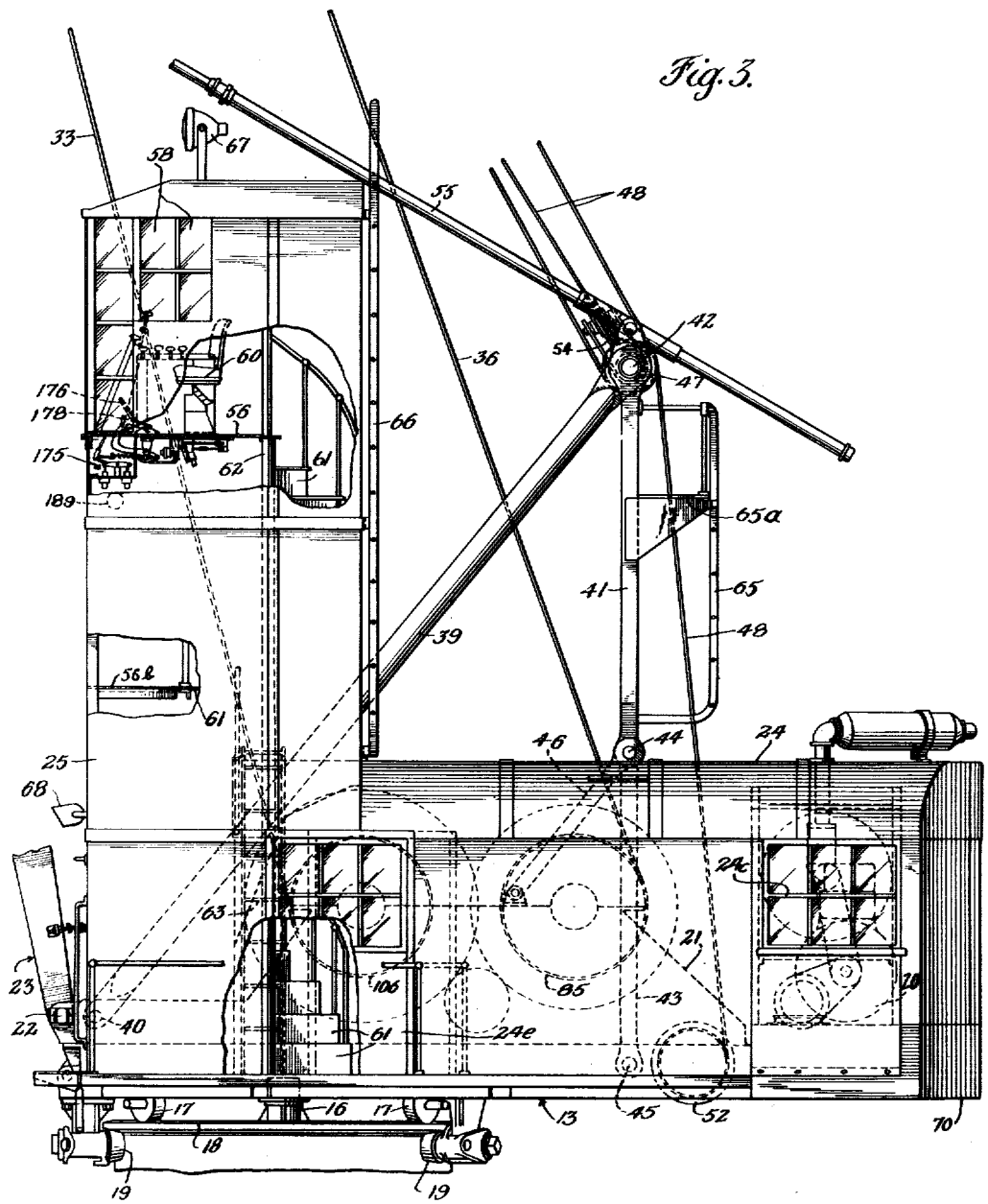

Oct. 23, 1951 W. M. HUSTON 2,572,029
LOAD HANDLING MACHINE
Filed July 5, 1945 11 Sheets-Sheet 4
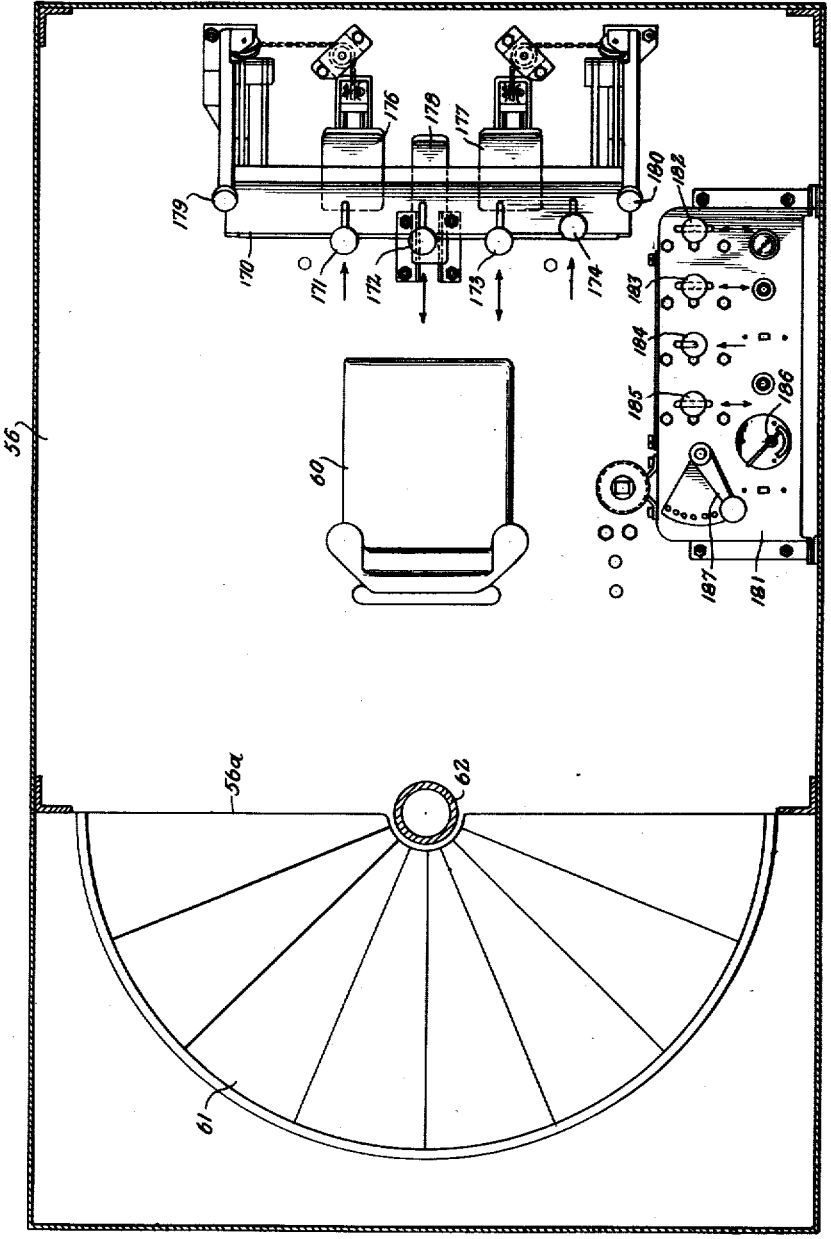
INVENTOR
William M. Huston
BY
ATTORNEYS Oct. 23, 1951  W. M. HUSTON  2,572,029
LOAD HANDLING MACHINE
Filed July 5, 1945  11 Sheets-Sheet 5

INVENTOR
William M. Huston
BY
ATTORNEYS

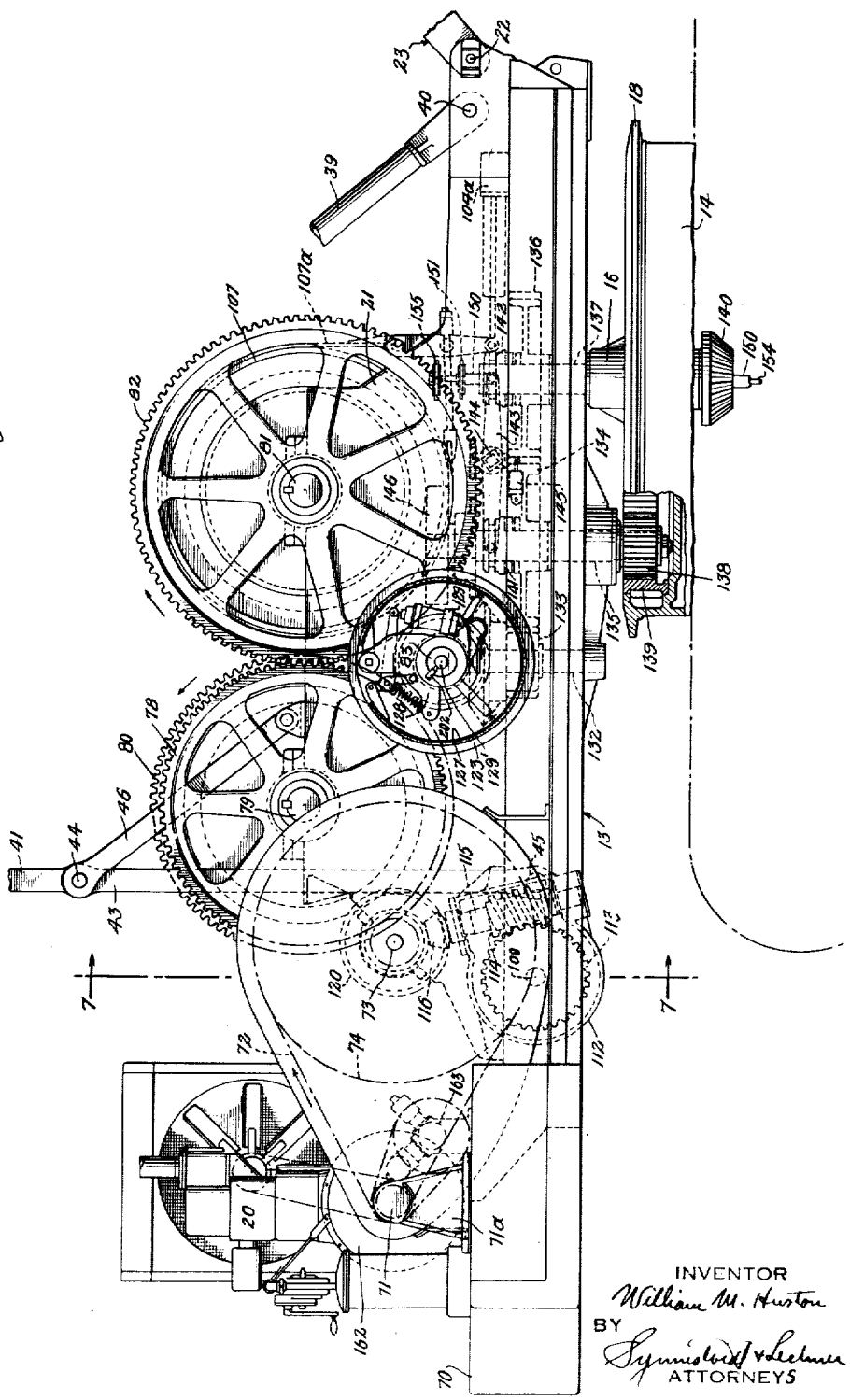

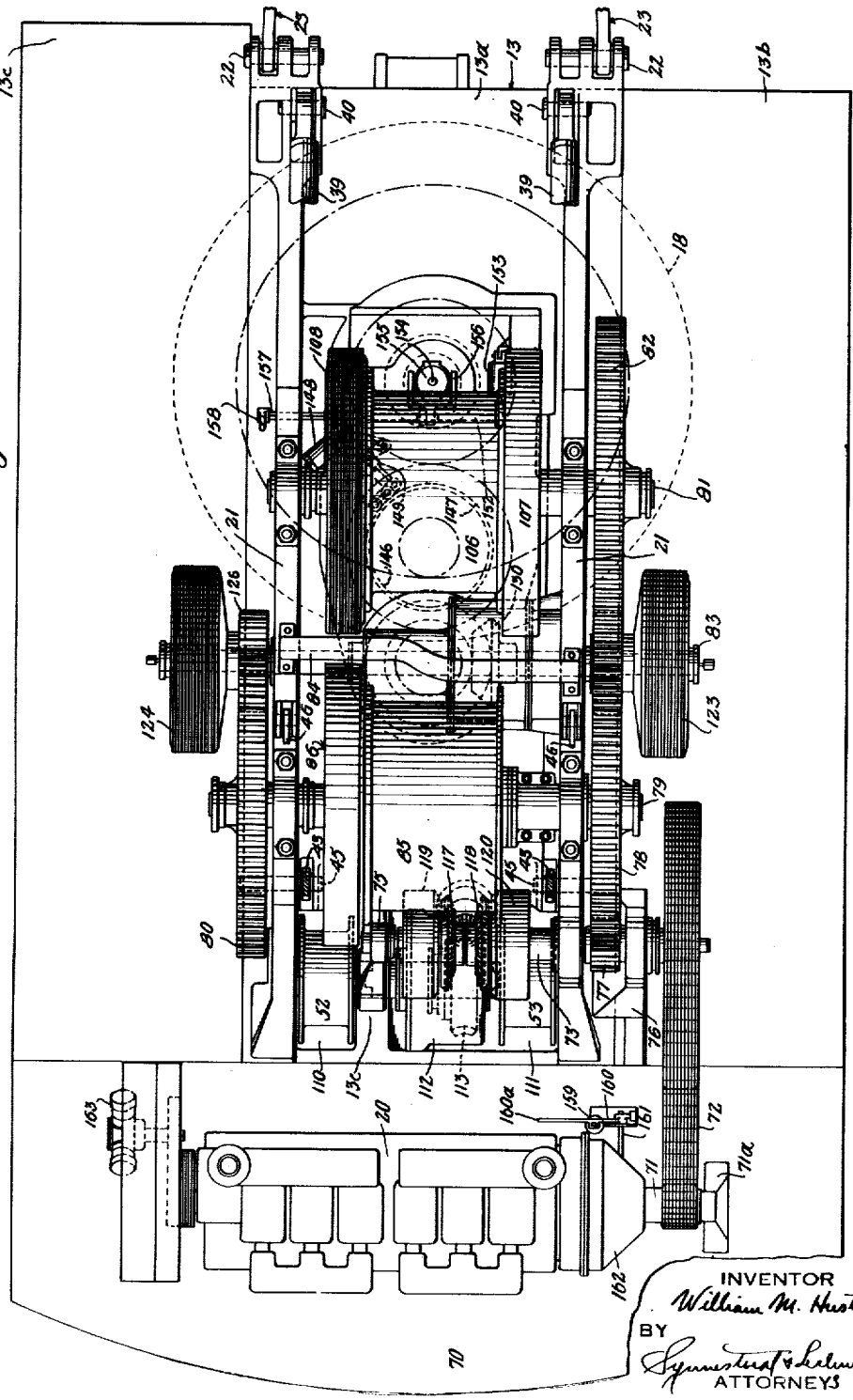

Oct. 23, 1951 W. M. HUSTON 2,572,029
LOAD HANDLING MACHINE
Filed July 5, 1945 11 Sheets-Sheet 8

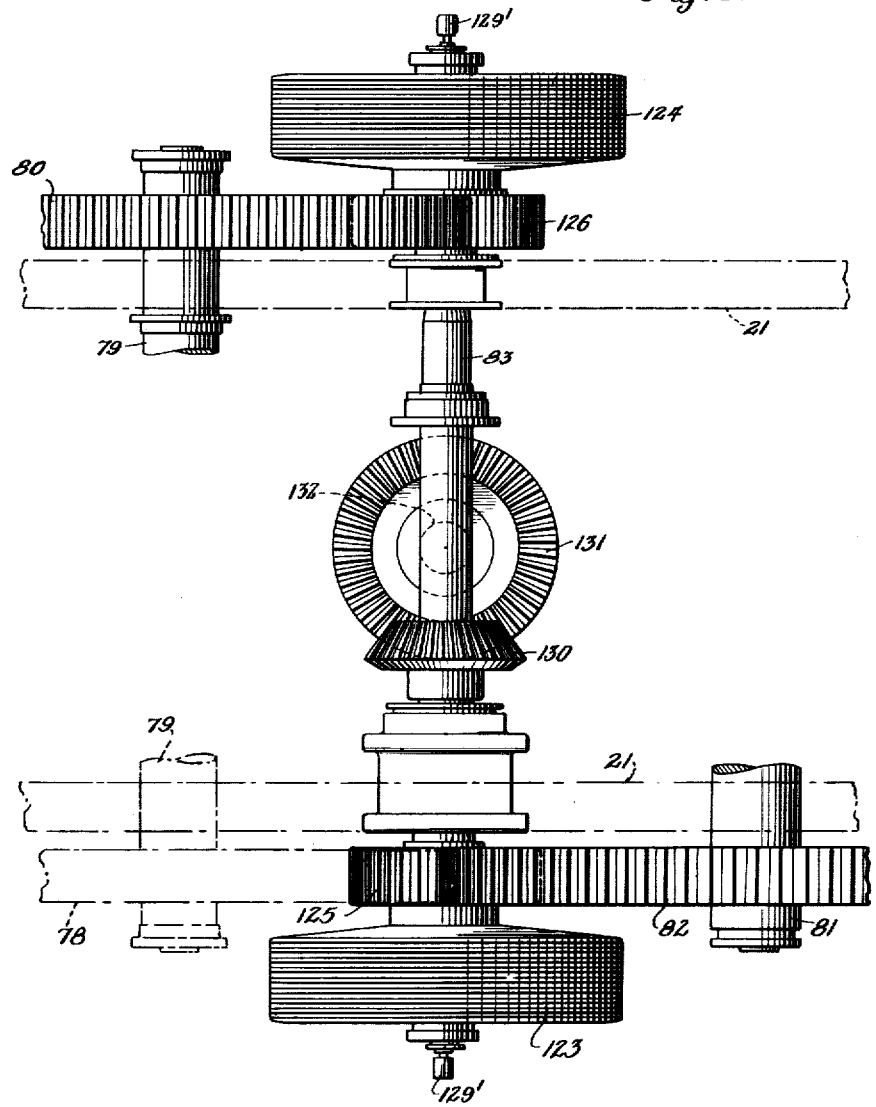

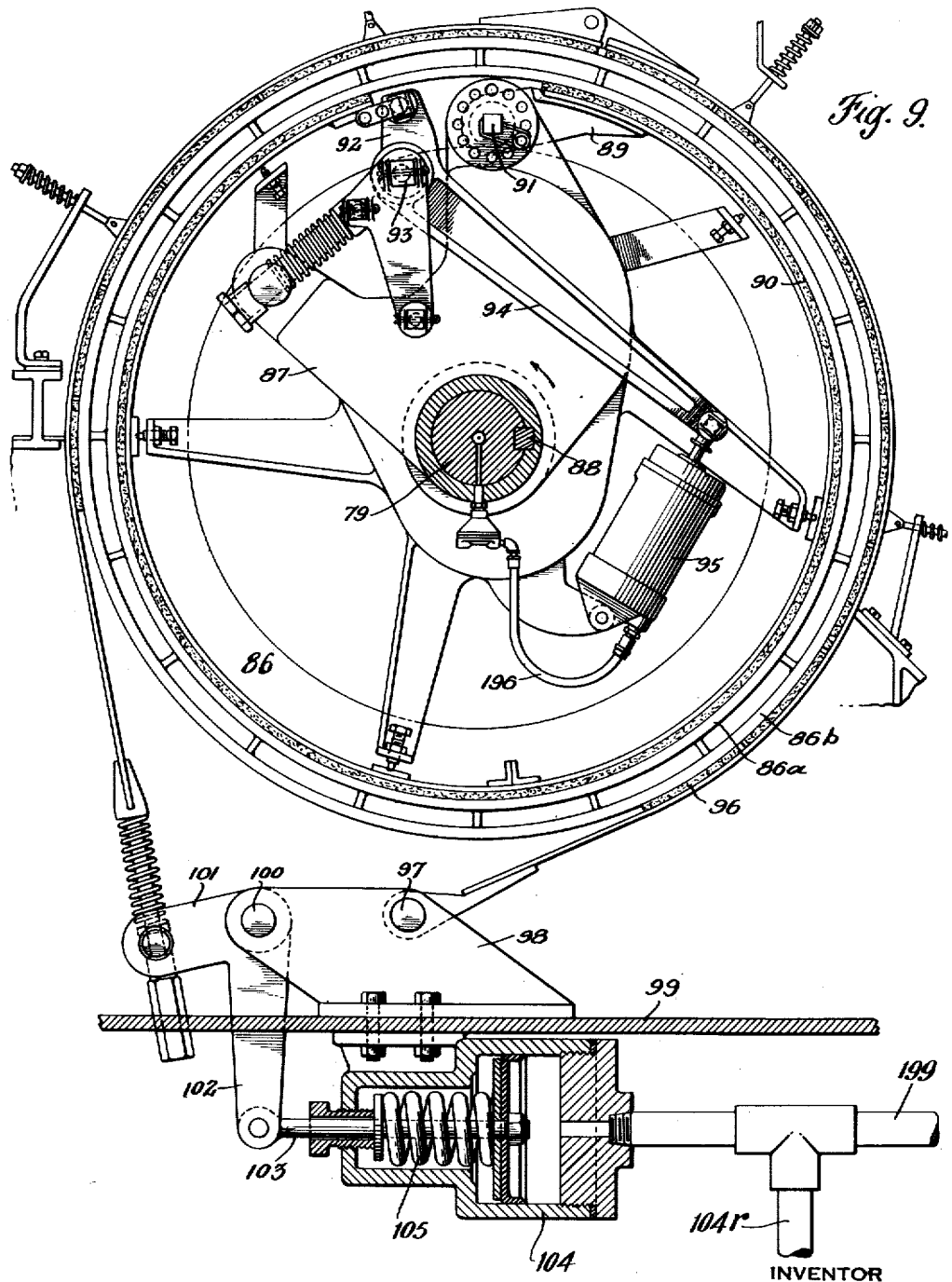

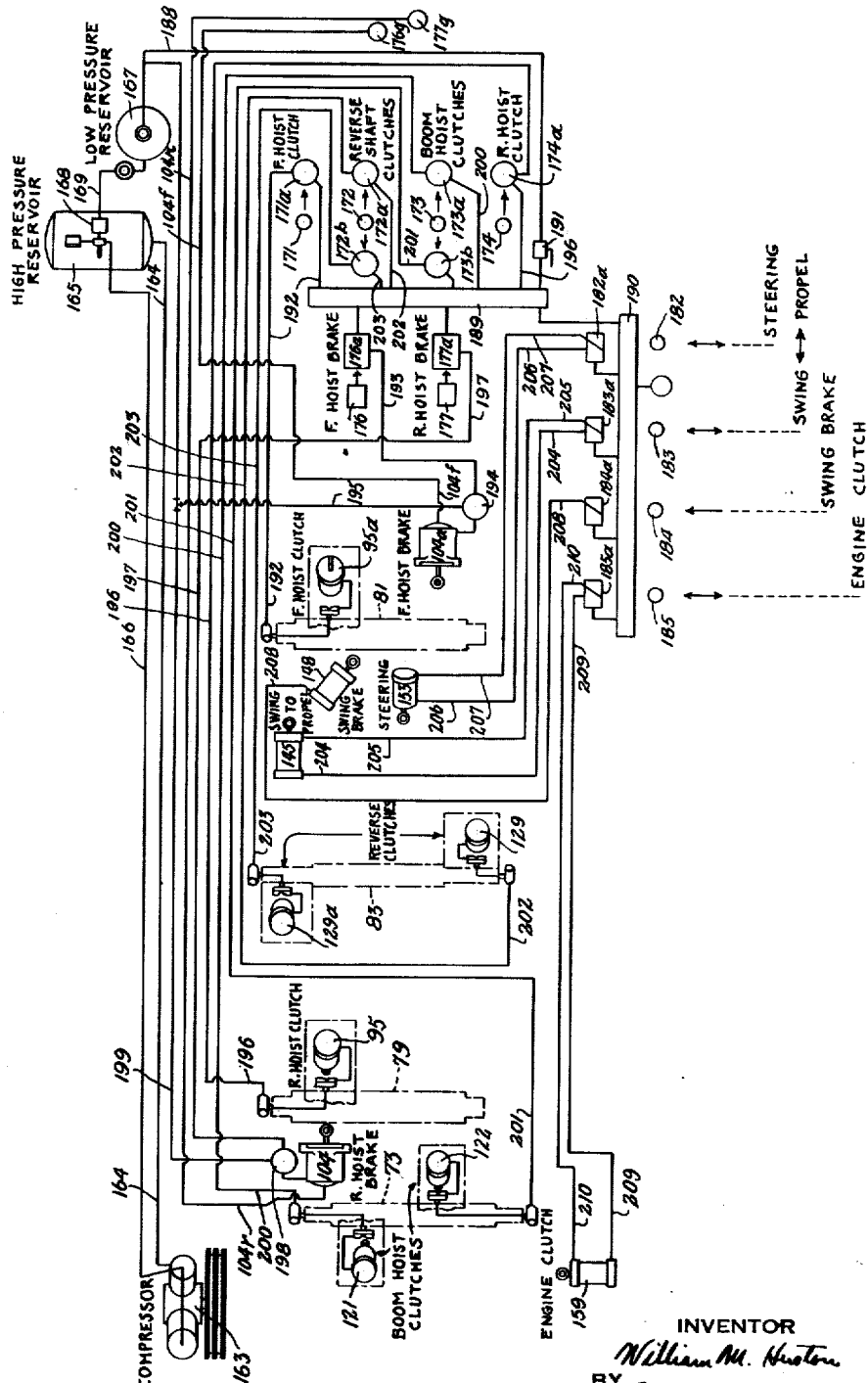

Patented Oct. 23, 1951

2,572,029

UNITED STATES PATENT OFFICE 2,572,029

LOAD HANDLING MACHINE

William M. Huston, Lima, Ohio

Application July 5, 1945, Serial No. 603,376

17 Claims. (Cl. 212—38)

This invention relates to load handling equipment and is concerned with a number of features of arrangement of the operating machinery and controls therefor, as well as with features of general arrangement of the machine as a whole including the rotating base structure, the cab, boom and gantry.

Although many features of the invention are of general applicability to load handling machines, certain of the features are of especial importance in machines of large size, adapted to handle heavy loads. Moreover, basically, the general arrangement of the machine, of the operating machinery and of the controls, is adaptable to load handling machines of a variety of types including cranes, shovels, clam shells, drag lines, and the like, although it is pointed out that certain features of the invention are of especial utility in large size cranes. Still further, the invention is especially useful in load handling machines of the type mounted on crawler trucks, adapted to be propelled by an engine or power plant carried by the rotating base. With the foregoing considerations in mind, the invention is hereinafter described and is illustrated in the accompanying drawings as applied to a crawler-type crane of large size capable of handling heavy loads.

One of the important objects of the invention is the provision of a load handling machine in which the rotating base carries a cab structure for housing the operating machinery, and further carries a control tower of considerable height, the operator's station being located at the top of the control tower at an elevation providing vision for the operator well above the cab structure for enclosing the operating machinery, and preferably even above the head of the gantry structure. In a machine of large size, as is herein contemplated, for instance with a boom in the neighborhood of sixty to a hundred feet in length, the operator's station is advantageously located at an elevation in the neighborhood of thirty feet from the ground, in consequence of which the operator's vision is greatly improved, particularly for certain special purposes such, for example, as the loading and unloading of railroad freight cars. With an arrangement such as just described the operator may readily look down into a freight car having side walls of the maximum standard height. Similarly, the elevation of the operator's station is of considerable importance and advantage in use of the machine on docks, for loading and unloading equipment into or from the holds of ships.

In accordance with another important aspect of the invention, the arrangement of the machinery on the rotating base is such as to more effectively utilize the weight of the machinery, than has been practicable heretofore, in counterbalancing the load being handled by the boom. To this end, at least the primary, and preferably all of the shafts utilized to perform the normal functions of the machine, such as swing, propel, hoisting, and boom hoisting, are located to the rear of the center of swing motion about which the rotating base is mounted on the crawler truck. In the preferred embodiment, the machine of the invention is adapted to cooperate with a boom having a boom extension or jib, the point of the boom itself and also the point of the jib both being provided with sheaves adapted to cooperate with hoist cables which are respectively reeved on separately controllable hoist drums. The two hoist drums, moreover, are preferably mounted on separate hoist shafts, both of which are located to the rear of the center of swing motion. Thus, even with the employment of a plurality of hoist drum shafts, all of the primary operating shafts of the machinery are located to the rear of the center of swing motion, with the advantage above mentioned of contributing counter-balancing. It may be mentioned in this connection that in a machine of large size, as herein contemplated, weighing, for example, in the neighborhood of 300,000 pounds, as much as 30,000 to 40,000 pounds less counterweight is required than in an arrangement in which one or more of the primary shafts of the machinery are located ahead of the center of swing motion.

According to another feature of the invention, two boom hoist drums are employed, these drums being arranged and mounted in a novel manner in the rotating base, as will further appear.

Still another object of the invention is the provision of a control mechanism, including various control organs located at the operator's station in the control tower, and connected with the machinery mounted on the rotating base for remote control thereof. To this end, the invention contemplates employment of a fluid pressure control system, with power cylinders associated with all of the major units of the machinery including, in the preferred embodiment, remotely controlled power cylinders for the engine clutch, the front hoist clutch, the front hoist brake, the rear hoist clutch, the rear hoist brake, the boom hoist clutches, the clutches employed for swing and propel in both directions, the swing brake, and the clutches for steering.

Beyond the foregoing, the controls at the operator's station are grouped in a novel manner, and in considering this feature it is first mentioned that certain units of the operating machinery are adapted to be conditioned to selectively perform the functions of swing and propel, and certain other units are adapted to be conditioned to selectively steer toward the right or the left. Moreover, it is here pointed out that the control tower is arranged toward one side of the machine, offset from the longitudinal vertical midplane of the gantry and boom. With the control tower and with machinery units arranged as above mentioned, the invention contemplates division of the several controls into two groups, one of which is located at the front of the operator's station and the other of which is located at a side thereof, preferably that side lying adjacent to the vertical plane of the boom and gantry.

More specifically, the controls which are grouped at the side of the operator's station include those which require presetting so as to condition various units of the machinery to selectively perform different functions; whereas the controls located at the front of the operator's station comprise all of those primary control organs which are employed to regulate the operation of the machinery to perform its basic functions of hoisting, boom hoisting, swing and propel. In addition, each of the groups of controls includes an engine throttle, the throttle in the front group taking the form of a foot throttle and that in the side group taking the form of a hand throttle. The control for the swing brake and for the engine clutch are advantageously also included in the side group. With the arrangements just mentioned, those controls which require the closest attention on the part of the operator are located toward the front of the operator's station, whereas those controls which require only presetting or only occasional operation are located at the side.

Another advantageous feature of the invention is the location of various control devices, particularly fluid pressure valves just below the floor or deck of the operator's compartment in the control tower. The actuating connections are thus brought down conveniently from the operator's station to the control valves, and fluid pressure lines are brought up from the machinery on the rotating base for connection with the valves just below the floor of the operator's station. With the control valves and the several fluid pressure connections grouped in this way, the invention contemplates location of a deck in the control tower intermediate the floor of the operator's station and the rotating base, which deck is positioned to provide convenient access to the control valves and the associated control connections.

Another feature of the arrangements in the control tower is the provision of a circular stairway within the tower providing access from the rotating base to the operator's station. This stairway, moreover, is so located as to provide also for convenient access to the intermediate deck provided below the location of the control valves and connections.

Beyond the foregoing provision is made according to the invention for convenient access to other portions of the machine as a whole, such as the gantry headshaft, the roof of the cab housing the machinery, and even the roof of the control tower.

Still another feature of the invention is the provision of a machine having a control tower, as above described, in which machine the boom carries a boom angle or radius indicator at a point spaced appreciably above the foot of the boom, so as to be readily visible from the operator's station in any angular position of the boom.

With reference to the machine as a whole, it may be said that the invention has, as an important general object, the provision of a load handling machine of large size capable of handling heavy loads, the operation and structure of the machine being simplified as much as is practicable consistent with safety and ruggedness.

How the foregoing objects and advantages are attained, together with others, will appear more fully from the following description referring to the accompanying drawings which illustrate a crawler-type crane constructed according to the present invention, and in which—

Figure 3 is an enlarged left side elevational view of the cab and tower structure and various associated parts, with portions of the cab and tower broken away to disclose certain interior arrangements;

Figure 4 is a further enlarged plan view of the operator's station in the top of the control tower, showing the arrangement of the several controls;

Figure 5 is a right side view, on a scale somewhat enlarged as compared with Figure 3, showing the general arrangement of the machinery and its mounting on the rotating base, certain portions of this view being broken out and shown in section, as is mentioned in detail hereinafter;

Figure 6 is a top plan view of the mechanism shown in Figure 5;

Figure 8 is a plan view on the scale of Figure 7, illustrating the reverse shaft arrangement in relation to certain other parts of the operating machinery;

Figure 9 is a view chiefly in elevation taken substantially as indicated by the line 9—9 on Figure 7; and Figure 10 is a piping diagram of the control system.

Figure 1:
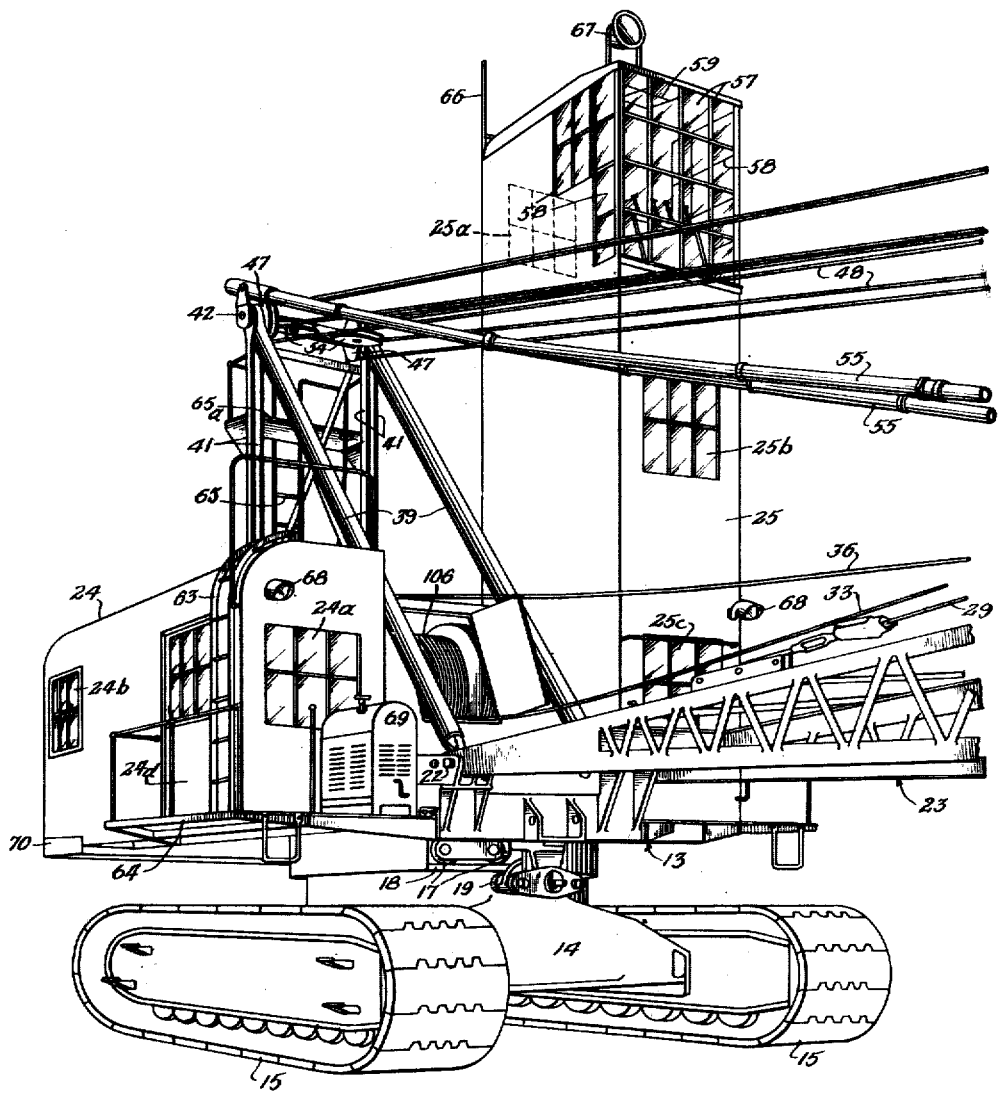
Figure 1 is a three-quarter front perspective view of a crane constructed according to the invention, the view including only a portion of the boom, which is shown in substantially horizontal position.

Although the drawings illustrate the invention as applied to a crane, in which association various features of the invention are of especial advantage, it should be kept in mind that many aspects of the invention are equally applicable to other types of load handling machines. In fact, certain basic or essential arrangements and structures, such as the rotating base, the machinery supports, the gantry, cab and control tower, may be used with little if any substitution of parts in machines such as shovels, drag lines, clam shells and the like. It is contemplated that when employing various features of the invention for machines other than cranes, different types of lagging may be associated with one or both of the hoist drums; and other clutch and drive mechanisms may be supported by the machinery frames and power shafts, in order to adapt the basic mechanism to perform the normal functions of load handling machines of other types. To illustrate, in the case of a power shovel, a hoist drum may be employed to perform the function of dipper hoisting, and appropriate mechanisms will be added or substituted in order to take care of the functions of crowd-out and crowd-in.

Various features of general arrangement will now be described with initial reference to Figures 1 to 4 inclusive.

The rotating base of the machine generally indicated at 13 is mounted on the crawler truck 14 having a pair of crawler treads 15—15 on which the machine is adapted to be propelled on the ground. The rotating base is mounted for swing motion with respect to the truck about a vertical axis defined by a central bearing 16, the weight of the machine being transmitted through main rollers, some of which are indicated at 17 in Figures 1 and 3, to the circular track 18 which is formed at the top of the truck structure 14. Hook rollers 19 are also associated with the circular track, the arrangement of main and hook rollers here shown constituting subject matter of my copending application Serial No. 603,379 filed concurrently herewith and entitled Load Handling Equipment, this copending application having issued July 4, 1950, as Patent No. 2,513,726. Since reference may be had to said copending application, the roller arrangement is not described herein in detail.

The rotating base serves to carry the engine 20 and machinery frames 21 (see Figures 3 and 2, respectively) and, at its forward end, the base also provides a point 22 for pivotal support of the foot end of the boom 23. The engine and the machinery on the rotating base are enclosed by a cab structure 24, and rising from the forward left hand corner of the rotating base is an operator's control tower 25.

Figure 2:
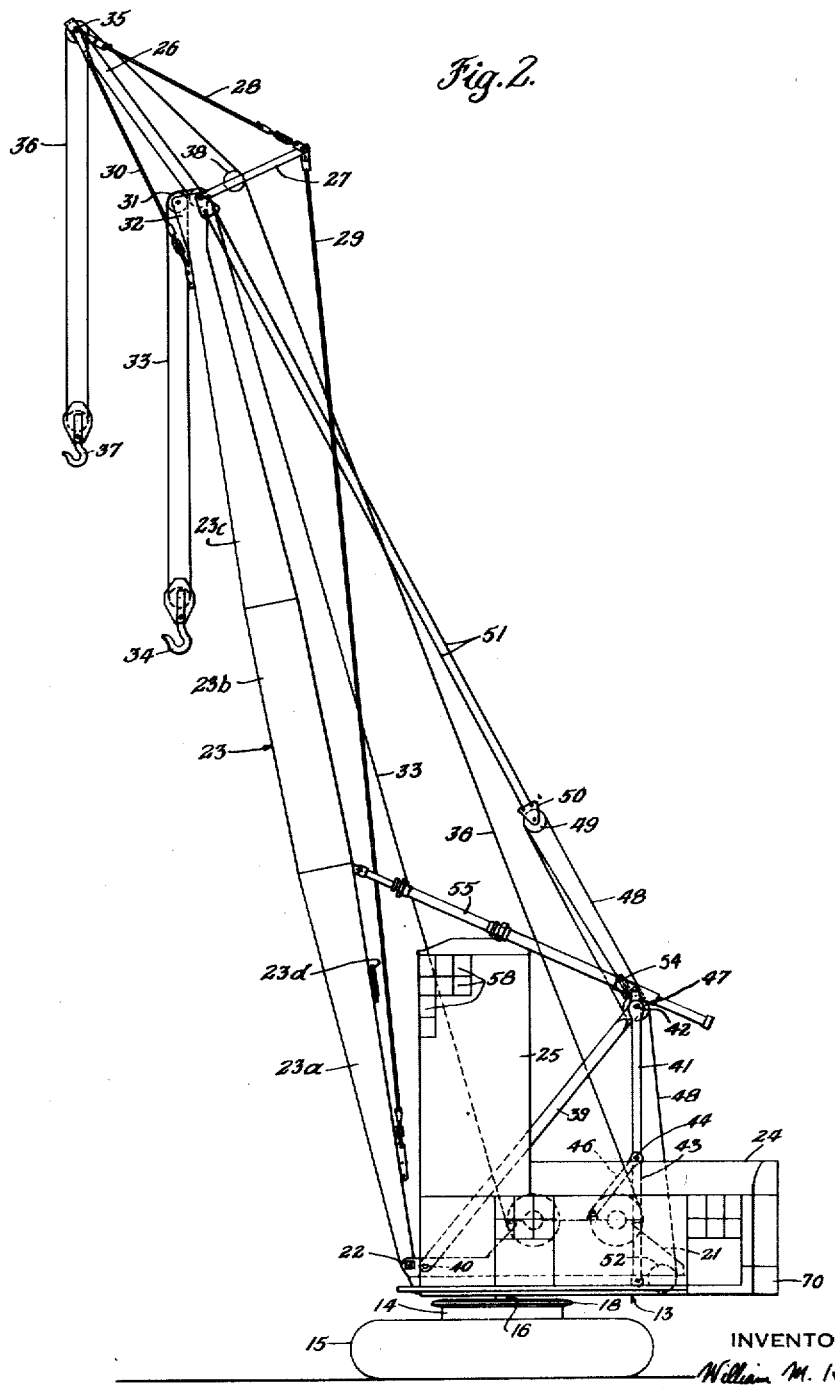
Figure 2 is a somewhat diagrammatic side outline view, on a reduced scale as compared with Figure 1, the boom in this view being illustrated toward the upper limit of its range of movement.

As seen in Figure 2, in the particular embodiment illustrated, the boom 23 is composed of three sections, 23–a, 23–b and 23–c. This boom further carries a jib 26 which is braced by means of a strut 27 and cables 28, 29 and 30. Sheaves 31 are associated with the point 32 of the boom, these sheaves cooperating with hoist cable 33 for operating the hook 34. The tip of the jib 26 also carries sheaves 35 with which hoist cable 36 is associated, this cable serving to operate the hook 37. A guide sheave 38 for the cable 36 is carried by the jib bracing strut 27. With reference to the boom structure described just above, it is pointed out that the main portion of the boom is sectionalized so that, if desired, the intermediate section 23–b may be taken out, in which event the lower end of section 23–c is adapted to mate with and be secured to the upper end of the lower section 23–a. Moreover the jib 26 may or may not be employed, according to the needs for which the machine is adapted. When the basic structure of the rotating base, machinery, etc., is employed in machines other than cranes, the elimination of the jib 26 and the hoist cable 36 associated therewith makes one of the hoist drum shafts available to perform other functions.

The boom is adapted to be supported by a gantry structure including a pair of front compression legs 39 which are pinned at 40 to the rotating base adjacent to the pivot point 22 for the boom. The gantry further includes pairs of rear tension legs 41—41 which, at their upper ends, are interconnected with the upper ends of the compression legs 39 by means of the gantry headshaft 42. Additional rear tension legs 43—43 are connected with the lower ends of legs 41 by means of a transverse shaft 44, the legs 43 being extended downwardly to be pinned to the rotating base as at 45. The rear tension legs 41—43 are braced by diagonal braces 46 which are extended between the transverse shaft 44 and the upper edges of the machinery frames 21. The details of this gantry structure need not be considered herein since they form no part of the present invention per se, the same being described and claimed in my copending application Serial No. 603,380, filed concurrently herewith entitled Gantry Structure, which application issued on April 20, 1948, as Patent No. 2,440,199.

The gantry headshaft 42 serves to support sheaves 47 cooperating with boom hoist cable 48, which cable is also associated with sheaves 49 carried by a sling 50 which is connected with the boom point 32 by means of sling cables 51.

The two ends of the boom hoist cable 48 are adapted to be reeved respectively on two boom hoist drums 52 and 53 (see Figures 2, 3, 6 and 7). Beginning at one drum 52 the boom hoist cable extends therefrom over certain sheaves 47 at the gantry headshaft and from there to sling sheaves 49, and back again to the sheaves on the gantry headshaft, there being several runs of cable arranged in this manner. The cable is then associated with the cross-over sheaves 54 which are slung from the gantry headshaft, and from there the cable passes in several runs between the headshaft and the sling sheaves 49, and the opposite end of the cable is ultimately reeved on the other boom hoist drum 53.

The gantry headshaft also serves as a reaction point for telescopic boom stop devices 55—55, these devices being shown in Figures 1, 2 and 3. It will be seen that the outer ends of the stop devices 55 are connected with the boom 23 at a point in the central region of the boom. The specific structure of the stops 55 need not be considered herein since they form no part of the present invention per se, the same being described and claimed in my copending application Serial No. 603,378, filed concurrently herewith and entitled Boom Stops for Load Handling Machines, this copending application having issued May 30, 1950, as Patent No. 2,509,686. It is here noted, however, that the boom stops are made up of telescopically associated tubular members which are adapted to act in compression between the boom and gantry head to prevent over-travel of the boom adjacent the upper limit of the range of movement, under certain abnormal conditions, for instance, in the event of a sling failure when handling a heavy load.

Attention is now called to the fact that the operator's control tower 25 is positioned to one side of the longitudinal vertical plane of the boom and gantry, so as to clear the various hoist and boom hoist cables, as well as the boom stops 55. The control tower, moreover, is of such height as to provide an operator's station, above floor 56 (see Figure 3) at an elevation affording vision for the operator well above the cab structure 24 and even above the level of the gantry headshaft 42. For clear vision in various directions, the front wall of the operator's station, from the floor 56 to the top, is comprised of windows 57. Windows 58 are also arranged at each side of the operator's station, and in addition windows 59 are provided in the tower roof. With the window arrangements mentioned, the operator may readily observe the load being handled and any surrounding obstacles, or the like, substantially throughout the entire range of swinging movement of the boom, and substantially through the entire range of hoisting provided by either of the hooks 34 and 37.

In association with the operator's station located at a considerable elevation above the rotating base, as described above, the arrangement of the invention provides a further advantageous feature, i. e., the mounting of a boom angle or radius indicator 23–d (see Figure 2) on the boom at a point spaced appreciably from the foot end thereof, so that when the boom is in substantially upright position the indicator is located approximately at the level of the operator's station, and so that when the boom swings downwardly to substantially horizontal position it can still be readily observed from the operator's station.

As best seen in Figures 3 and 4, a seat 60 for the operator is arranged generally centrally of the operator's station, the controls, which are described more fully hereinafter, being located to the front of and at the right hand side of the operator's seat 60. As shown in Figure 4, the floor 56 of the operator's station is terminated at the line 56–a, leaving a substantially clear vertical well in the rear portion of the control tower, and beneath the floor 56 in which well a circular stair 61 is provided, the treads and risers radiating from the central supporting column 62. This stairway extends down to the rotating base 13, the upper and lower ends thereof both being shown in Figure 3; and in this way convenient access is provided from the rotating base to the operator's station. The stairway further provides access to a deck or platform 56–b located in the tower at an elevation intermediate the rotating base and the floor of the operator's station. This deck (56–b) is provided for convenience in making repairs or adjustments on various devices of the control system, which is mounted just below the floor 56 of the operator's station, as is described hereinafter.

Access from the rotating base to various other parts of the machine is also facilitated by employment of ladders, such as the ladder indicated at 63 in Figures 1 and 3, which extends upwardly from the side platform 64 of the rotating base to the roof of the cab structure 24. Access from the roof of the cab to the gantry headshaft is provided by a ladder 65 which is supported by the gantry legs 41 (see Figures 1 and 3). A platform 65–a is carried between the gantry legs 41 and the ladder 65, to provide convenient access for a workman in lubricating, inspecting or repairing the several structures arranged at the gantry headshaft. Access from the roof of the cab structure 24 to the roof of the control tower is provided for by a ladder 66.

In addition to the control tower windows above mentioned (57, 58 and 59), the tower is preferably also provided with a window 25–a at the rear wall of the operator's station (see Figure 1), as well as with windows 25–b and 25–c in the front wall of the tower below the operator's station (see Figure 1). Moreover, the cab structure is also provided with windows at 24–a, 24–b and 24–c (see Figures 1 and 3), and with a door 24–d at the right hand side toward the front, and a door 24–e at the left hand side toward the front, the two doors each being provided with lights for increased illumination in the interior of the cab.

Mounted on top of the control tower roof is a searchlight 67 for convenience in night work. In addition, a pair of searchlights 68—68 are arranged one toward each side of the machine at the front (see Figure 1), and the lights 67 and 68, as well as other lighting and electrical equipment employed throughout the machine are supplied with current from a self-contained generating plant which is shown at 69.

In considering the mounting of the machinery on the rotating base 13 and the machinery frames 21, attention is directed to Figures 5 to 9, inclusive, and it is noted that certain features of the rotating base itself constitute subject matter disclosed and claimed in my copending application Serial No. 603,382, filed concurrently herewith and entitled Rotating Base for Load Handling Machines, which application issued on January 4, 1949, as Patent No. 2,458,271. From Figure 6 it will be seen that the rotating base comprises a central base structure constituting the "backbone" of the machine, which may either be of built-up construction or, as shown in the drawings, may comprise a casting 13–a. All the major operating units of the machine are connected to or anchored on this base casting. The central casting also serves to carry the lateral extensions 13–b and 13–c providing a platform extending around the machinery. One or more counterweights 70 are fastened to the central casting 13–a toward its rear end and the engine 20 is also mounted at the rear end. The engine shaft 71, which is supported in a bearing standard 71–a, carries a sprocket cooperating with a chain 72 which chain serves to drive the jack shaft 73 through the sprocket 74 (see Figures 5, 6 and 7). The jack shaft is journalled in the right hand machinery frame 21 and also in a support 75 which rises from an intermediate portion 13–c of the base casting 13–a. Another jack shaft support 76 is provided just inside the plane of the sprocket 74. As clearly appears in Figures 6 and 7, the jack shaft 73 carries a pinion 77 which is keyed to the shaft, this pinion meshing with a gear 78, fixed on the rear hoist drum shaft 79 which is journalled at the upper edges of the machinery frames 21—21 and extends across the machine to carry another gear 80 which is keyed to its opposite end.

Another front hoist drum shaft 81 is mounted at the upper edges of the machinery frames ahead of the shaft 79, the shaft 81 having keyed thereon a gear 82 which meshes with gear 78 to receive power therefrom.

A horizontal reverse clutch shaft 83 is located intermediate the rear and front hoist drum shafts 79 and 81, shaft 83 being journalled in the machinery frames 21 in the lower region thereof and having associated therewith certain gears and clutches described below for effecting the functions of swing and propel. At this point, it is noted that with the arrangement of shafts just described, particularly the two drum shafts 79 and 81 adjacent the top of the machinery frames, and with shaft 83 mounted intermediate the drum shafts in the lower region of the machinery frames, the invention further contemplates a machinery frame interbrace 84 interconnecting the upper edges of the machinery frames in the region above the transverse shaft 83 and intermediate the two drum shafts 79 and 81.

Figure 7:
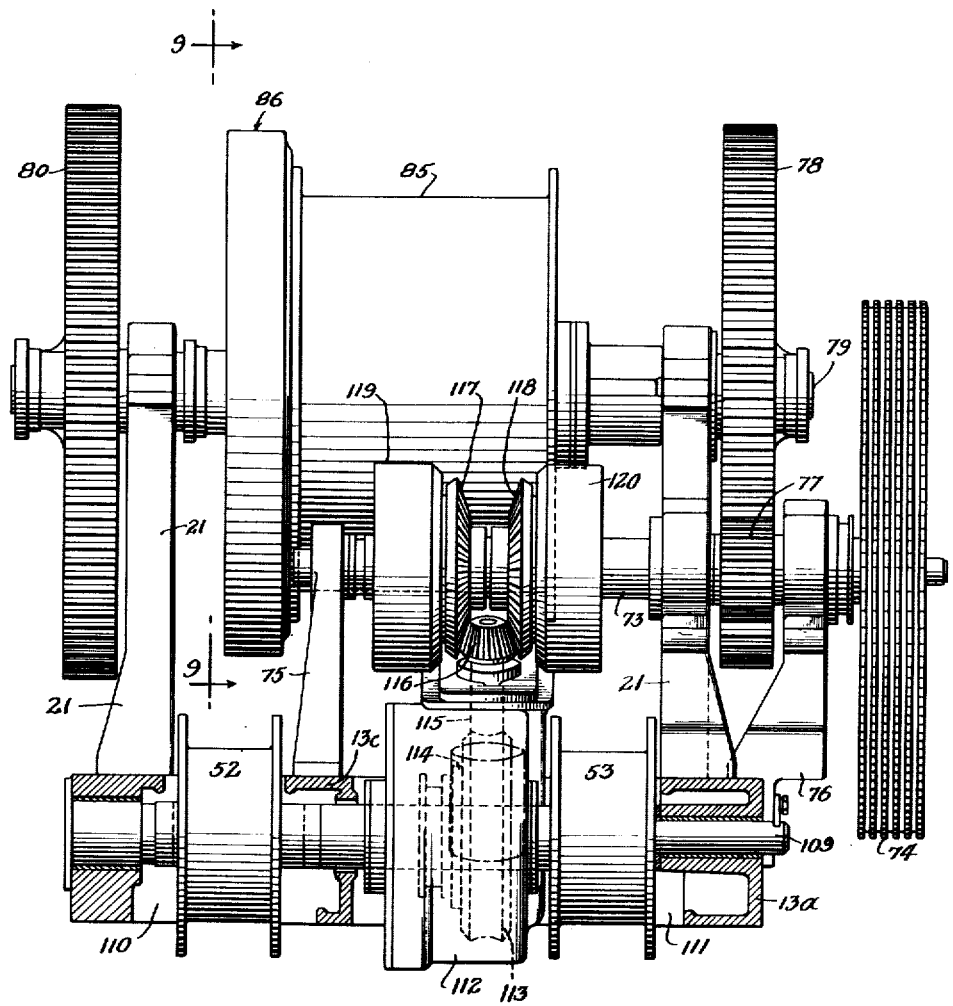
Figure 7 is a view of portions of the operating machinery taken substantially as indicated by the line 7—7 on Figure 5, this view being to an enlarged scale as compared with Figure 5.

The various functions of the machine are performed by the clutching of various operating units to the primary machinery shafts already mentioned above. Although the details of the clutches form no part of the present invention per se, the general arrangement of one of them is described just below to illustrate the manner in which the power is transmitted from the shaft to an operating unit. For purposes of illustration, reference is made to the clutch and other devices which are associated with the rear drum shaft 79, as shown in Figures 6, 7 and 9.

First note that shaft 79 carries a cable drum 85, which drum is adapted to cooperate with the hoist cable 36 shown in Figures 2 and 3 as extended upwardly to pass over the sheaves 35 at the point of the boom jib 26. Drum 85 is rotatively mounted on shaft 79 and has a clutch housing 86 connected for rotation therewith (i. e., with the drum). The clutch housing 86 (see Figure 9) comprises an internal cylindrical part 86–a within which is arranged an internal expanding friction clutch, and also an external cylindrical part 86–b adapted to cooperate with an external contracting friction brake band, the clutch and brake being clearly illustrated in Figure 9 and described just below, although it may be mentioned that the brake band has been omitted from the showing of Figures 6 and 7 for the sake of clarity.

Referring now to Figure 9, a clutch spider 87 is keyed as at 88 to the rear drum shaft 79, the spider serving to carry a supporting bracket 89 for the dead end of the clutch band 90, this bracket being adjustable with reference to the spider 87 by an eccentric adjustment device 91. The live end of the clutch band 90 is associated with one arm 92 of a control lever which is pivoted at 93, the other arm 94 of this lever being associated with a fluid pressure power cylinder 95 by means of which the clutch may be engaged and disengaged. The type of arrangement here shown for mounting the control lever 92—94 is fully disclosed in Parsons Patent No. 2,352,969, issued July 4, 1944.

The dead end of the external brake band 96 is anchored at 97 on a bracket 98 mounted on a fixed structure 99. Bracket 98 also serves to mount the fulcrum 100 of the brake operating bell crank lever, one arm 101 of which is connected with the live end of the brake band and the other arm 102 of which is connected by means of link 103 with the power piston in the fluid pressure cylinder 104. A spring 105 urges the operating lever arm 102 in the direction to apply the brake. The brake is thus of the "spring-set" type, the power cylinder 104 acting to effect release against the action of the spring.

With a mechanism of the type described just above in connection with Figure 9, it will be seen that upon engagement of the clutch 90, the clutch housing 86 is caused to rotate with the shaft 79, thereby rotating drum 85, to wind in the hoist cable 36 and thus raise a load being handled by hook 37. When it is desired to lower hook 37, the clutch is of course disengaged and the rate and extent of lowering is controlled by the brake 96, the setting of which is determined by the relation between the force of spring 105 and the pressure in cylinder 104.

The fluid pressure control cylinders 95 and 104 are adapted to be operated by controls located at the operator's station in the control tower, as are various other similar fluid pressure control devices mentioned hereinafter. The control system which is associated with cylinders 95 and 104 and also with other power cylinders is described below with particular reference to Figure 10.

Referring now to the front drum shaft 81, this shaft carries a cable drum 106 adapted to cooperate with the main hoist cable 33 (see Figures 2 and 3), the drum 106 being rotatively mounted on shaft 81. Rotative with the drum 106 is a cylindrical braking surface 107 (see Figure 6) located at one side of the drum, and also a clutch housing 108 located at the other side of the drum. A friction brake band 107–a (see Figure 5) is adapted to cooperate with the brake surface 107, this band being similar to that described above with reference to Figure 9 and being adapted to be controlled by a fluid pressure power cylinder shown at 104–a in Figures 5 and 10. An internal expanding clutch similar to that illustrated in Figure 9 is positioned within the clutch housing 108, this clutch being adapted to be operated by a fluid pressure power cylinder similar to cylinder 95 of Figure 9, as indicated at 95–a in Figure 10. Thus the front hoist drum 106 is adapted to be connected with the shaft 81 by means of a clutch lying within the housing 108 in order to raise the main hook 34; and the brake 107–a associated with brake surface 107 is employed to control the rate and extent of lowering of hook 34.

Turning now to the boom hoist function, particular attention is directed to Figures 5, 6 and 7. As there shown the boom hoist drums 52 and 53 are mounted to rotate on boom hoist shaft 109, which is secured in the rotating base casting 13–a. One of the drums 52 lies in a recess or pocket 110 provided toward the left hand side of the machine, and the other 53 in a larger pocket 111 provided toward the other side of the machine but extended centrally of the base sufficiently to accommodate the transmission or gear casing 112. Within this casing 112 shaft 109 carries a worm wheel 113 meshing with worm 114, constituting an irreversible worm drive. The worm is mounted on shaft 115 which is journalled in the casing 112. At its upper end, exteriorly of casing 112, shaft 115 carries a bevel pinion 116 meshing with a pair of bevel gears 117—118 which are respectively fastened to clutch housings 119 and 120. Each of the gear and clutch housing assemblies 117—118 and 118—120, is rotatively mounted on the jack shaft 73, and an internal expanding clutch is arranged within each one of the housings 119 and 120, these clutches being adapted to alternatively clutch one or the other of the housings to the jack shaft, so as to rotate bevel pinion 116 in one direction or the other and thereby provide for lowering or raising of the boom at will, it being understood that the ends of the boom hoist cable 48 are reeved respectively on the two boom hoist drums 52 and 53. The clutches for controlling, raising and lowering of the boom are adapted to be actuated by fluid pressure power cylinders of the general type already discussed above, these two cylinders being shown at 121 and 122 in Figure 10.

Turning now to the functions of swing and propel, it is first noted that provision is made for driving the horizontal reverse clutch shaft in either direction, the mechanism employed for this purpose being shown in Figures 5, 6 and 8. At opposite ends of shaft 83, outside of the planes of the driving gearing 82 and 80, clutch housings 123 and 124 are mounted. A gear 125, meshing with gear 82, is fixed to rotate with clutch 123, this assembly (123—125) being rotatively mounted on shaft 83. Similarly a gear 126, meshing with gear 80, is fixed to rotate with clutch housing 124, the two being rotative on the shaft 83. As seen in Figure 5, an internal expanding friction clutch 127 is aranged within the housing 123, being supported by a spider 128 which is keyed to shaft 83. This clutch mechanism is generally similar to that described above in connection with Figure 9 and is adapted to be actuated by a fluid pressure power cylinder 129 (see also Figure 10). Upon engagement of clutch band 127, the shaft 83 is caused to rotate with gear 125, which meshes with gear 82 on the front drum shaft 81. A similar clutch arrangement is associated with the clutch housing 124, this latter clutch also being adapted to be operated by a fluid pressure power cylinder which is shown in Figure 10 at 129–a. Because of the fact that gears 80 and 82 rotate in opposite directions, shaft 83 may be driven in opposite directions by engagement of one or the other of the clutches at its outer ends. Engagement of these clutches, respectively, is effected through fluid pressure connections which include rotative joints 129' at the ends of shaft 83.

Power is delivered from shaft 83 through bevel pinion 130 to a bevel gear 131, the latter being fixed at the upper end of the vertical reversing shaft 132, which shaft further carries a pinion 133 meshing with a gear 134. Gear 134 is rotative with respect to the vertical swing shaft 135. Similarly, a gear 136 is rotative with respect to the vertical propel shaft 137, the two gears 134 and 136 intermeshing and therefore being rotated with the vertical reversing shaft 132 and with the gears 133 and 131 carried thereby.

Swing motion is effected by virtue of a pinion 138 fixed to the lower end of the vertical swing shaft and meshing with the internal ring gear 139 formed just inside of the circular track 18 on the truck structure 14. The vertical propel shaft 137 carries a bevel pinion 140 at its lower end which is adapted to cooperate with truck drive mechanism (not shown), for example of the general type shown in copending application of this applicant and Cecil E. Jones, Serial No. 454,-792, filed August 14, 1942, which application issued on October 23, 1945, as Patent No. 2,387,268. Since the truck drive forms no part of the present invention per se, it need not be considered herein. Gear 134 is adapted to be clutched to the vertical swing shaft 135; and, similarly, gear 136 is adapted to be clutched to the vertical propel shaft 137. For this purpose swing and propel dog clutches 141 and 142 are keyed to shafts 135 and 137, respectively, these clutches being arranged above the gears 134 and 136 and being adapted to be engaged alternatively. Actuation of the clutches is effected by a double-ended lever 143 which is pivoted at 144, the two ends of the lever cooperating with clutches 141 and 142, so that upon rocking of the lever either clutch is engaged and the other disengaged. In Figure 5 the clutches 141 and 142 are both shown disengaged for the sake of clarity of illustration, but it is to be understood that normally one or the other of these clutches remains engaged. The lever 143 is adapted to be actuated by a fluid pressure power cylinder device 145 (see also Figure 10), coupled to shaft 144 by a short lever.

By virtue of the arrangement described just above, the vertical reversing shaft 135 and the vertical propel shaft 137 may alternatively be driven in either direction, the two directions of rotation being secured by virtue of engagement of one or the other of the clutches associated with the ends of the horizontal reverse clutch shaft 83.

The vertical swing shaft 135 also has a brake associated with its upper end, the brake including braking surface 146 keyed to the upper end of shaft 135 and surrounded by an external contracting brake band 147 (see Figure 6) which is adapted to be actuated by a fluid pressure piston and cylinder device 148 (see also Figure 10) through links and levers indicated at 149.

It is here noted that certain structural features of the machinery for performing the functions of swing and propel, as above described, are shown and claimed in my Patent No. 2,354,863 issued August 1, 1944, so that detailed descriptions of those parts need not be given herein, but it is to be understood that certain of these parts shown in my prior patent are herein disclosed in a novel association with certain other parts of the machine of the present invention, and further that according to the present invention an improved form of control system is provided, which control system is not disclosed in my prior patent aforesaid.

For the purpose of effecting steering of the crawler truck, a control tube 150 is extended downwardly through the vertical propel shaft 137 for actuation of certain truck drive clutches in the manner disclosed in copending application above mentioned, Serial No. 454,792. The upper end of control tube 150 is adapted to be moved vertically by means of a control arm or yoke (not shown) engaging member 151 which is fixed at the top of the control tube (as shown in Figure 5), the arm or yoke being fixed to a transverse shaft 152, and the shaft being provided with an operating power cylinder and piston device 153 (see also Figure 10) by means of which the control tube 150 may be raised or lowered. The details of this truck steering control need not be considered herein, although it may be mentioned that the fluid pressure actuating device 153 is incorporated in the control system of the present invention.

The crawler truck is further provided with an adjustable locking device of the general type disclosed in Jones Patent No. 2,351,685 issued February 20, 1944. Although the specific structure of the truck lock need not be considered herein, it is mentioned that the lock is adapted to be controlled by the central control rod 154 which extends vertically through the control tube 150. At its upper end, the control rod 154 carries a member 155 with which a yoke 156 is associated, the yoke being secured to a transverse control shaft 157 which is extended laterally beyond the machinery frames 21 appearing toward the top of Figure 6 and there provided with a manual operating lever 158.

The various control devices, especially the fluid pressure cylinder and piston devices above mentioned, are all incorporated in the control system for the machine, being operated by remote control from the operator's station. In addition to the control devices already mentioned, the operator in the control tower is further given certain engine controls, including a control for the fluid pressure cylinder and piston device 159 (see Figures 6 and 10) which serves to actuate a lever 160 mounted on shaft 161 which is extended into the clutch casing 162 of the engine. Casing 162 encloses a master clutch by which the engine may be disconnected from all of the operating machinery. Clutch operating lever 160 has an extension 160–a by which the clutch may be manually actuated by an attendant stationed on the rotating base in the cab. The other engine controls which are given to the operator in the control tower are referred to hereinafter with reference to Figures 4 and 10.

It is here mentioned that although the arrangement of control organs at the operator's station in the control tower, as provided by the invention, may be used in association with remote control connections of other types, I prefer to employ a system of fluid pressure connections, most advantageously air pressure. For this purpose, the engine is utilized to drive an air compressor 163 (see Figures 5, 6 and 10), the compressor delivering air under pressure through line 164 to a high pressure reservoir 165 which is provided with a cut-out line 166 returning to the compressor. A low pressure reservoir 167 receives air from reservoir 165 through a reducing valve 168 and pipe 169. All of the fluid pressure control devices of the machine are supplied with air pressure from the low pressure reservoir 167.

Figure 4F:
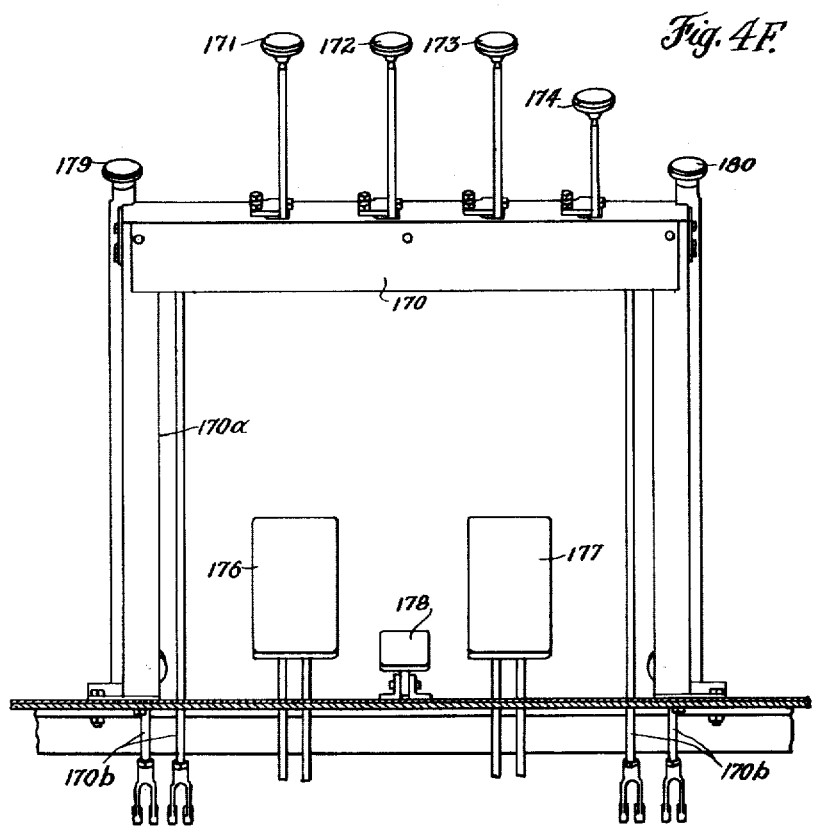
Figure 4F is an elevational view of the control stand which is located at the front of the operator's station.
Figure 4S:
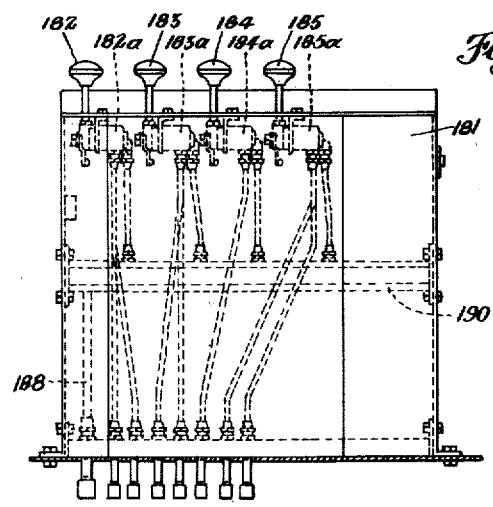
Figure 4S is an elevational view of the control stand which is located at the side of the operator's station.

Reference is now made to the arrangement of the controls in the control tower, and in this description particular attention is directed to Figures 4, 4F, 4S, 3 and 10. As shown in Figures 4 and 4F, a control stand 170 is arranged in front of the operator's seat 60, this stand being carried at its ends by upright supports 170–a, and serving to support four control knobs, 171, 172, 173 and 174, the functions of which are described below, with reference to Figure 10. These control knobs are mechanically coupled with fluid pressure control valves such as those indicated at 175 in Figure 3, which valves are mounted just below the floor 56 of the operator's station.

The mechanical connections between the knobs on the control stand and the control valves need not be considered in detail herein. However, it is noted that they are advantageously carried horizontally in the control stand itself toward the ends thereof and thence downwardly, for instance by means of rods 170–b (see Figure 4F), through the floor 56, so as to leave a clear space below the control stand for the mounting and operation of certain foot controls, including a pair of hoist brake pedals 176 and 177, and an intermediate spring-released pedal 178 which is connected with the engine throttle and serves as a foot accelerator. Provision of a clear space below the top board of the front control stand is also of importance in improving the operator's range of vision, especially downwardly at the front. The operator thus has a line of vision below the front stand through the front windows 57 which, as noted above, extend down to the floor 56, this being of particular advantage in a machine as here disclosed in which the operator's station is located at a considerable elevation. In this connection it is also pointed out that location of the control valves 175 and associated devices below the floor 56 of the operator's station is also of importance in providing clear space for good vision below the front control stand. Pedals 176 and 177 serve to release the two hoist brakes, and each is provided with a releasable device for retaining the pedal in brake release position, without the necessity for the operator to keep a foot on the pedal. The details of this mechanism need not be considered herein, but it is noted that the arrangement of these releasable retaining devices is such that they are brought up to the front control stand, the device for pedal 176 taking the form of a controllable knob 179, and the device for pedal 177, a knob 180, the two knobs being disposed toward opposite ends of the control stand.

A side control stand 181 (shown in Figures 4 and 4S) is positioned toward that side of the operator's seat 60 presented toward the central vertical plane of the boom and gantry, i. e., at the operator's right hand. This side control stand serves to support four knobs, 182, 183, 184 and 185, the functions of which are described below. The side control stand further is provided with an engine starter control 186 and a hand throttle control 187 which may be adjusted to any desired minimum engine speed setting. The fluid pressure control valves 182–a to 185–a which are actuated by the knobs 182 to 185 are advantageously mounted directly below the top plate of the side control stand 181, fluid pressure control pipes described herebelow being extended therefrom downwardly to the machinery on the rotating base. Since this control stand is located at the side, clearance room for foot controls therebelow is not required. As will be seen from comparison of Figures 1 and 4, a line of vision for the operator downwardly through the lowermost side windows 58 is provided by location of the side control stand in a position spaced somewhat from the front wall of the tower.

Control stand 181 may also be employed to carry other devices which need not be considered herein, such as gauges, electric switches for lighting, and the like.

Attention is now directed to the piping system illustrated in Figure 10, on which the several cylinder and piston devices are shown, and on which an indication is also made of the principal machinery shafts and of the control knobs and pedals located to the front and to the side of the operator's station.

A fluid pressure supply line 188 is extended from the reservoir 167 (which is advantageously located on the rotating base) upwardly in the control tower to two manifolds 189 and 190 which are associated respectively with the controls on the front and side control stands. A shut-off cock 191 is provided in the supply line 188 in advance of the manifolds 189 and 190. Manifold 189 is preferably mounted below the floor 56 of the operator's station, for instance in association with control valves 175, but manifold 190 is advantageously mounted in the side control stand 181 (see Figure 4S) in close association with the valves 182–a to 185–a.

Actuation of the front hoist clutch 95–a is accomplished by a control valve 171–a operated by knob 171. Opening of valve 171–a delivers fluid trough line 192 to the clutch cylinder 95–a. Release of the brake for the front hoist drum is accomplished by actuation of the foot pedal 176 which operates valve 176–a to deliver pressure through line 193 to the relay valve 194 which, in turn, opens line 195 for delivery of operating fluid to brake cylinder 104–a directly from the supply reservoir 167. By this arrangement, the main air pressure for operating the hoist brake is not required to pass through the manifold 189. A pressure gauge 176–g connected with cylinder 104–a through the gauge line 104–f serves to indicate the pressure in the control cylinder for the front hoist brake.

The rear hoist drum may be clutched to its shaft 79 by knob 174 which controls valve 174-a to deliver fluid through pipe 196 to the clutch cylinder 95. Release of the brake for the rear hoist drum is effected by pedal 177 which operates valve 177-a, thereby delivering pressure through line 197 to the relay valve 198 which, in turn, is thereby opened to deliver operating fluid to cylinder 104 directly from the reservoir 167, through pipe 199. A pressure gauge 177-g connected with cylinder 104 through the gauge line 104-r serves to indicate the releasing pressure in the control cylinder for the rear hoist brake.

The control knob 173 is operable both fore and aft to alternatively open valves 173-a and 173-b. Opening valve 173-a delivers pressure through line 200 to one of the clutches (121) associated with the jack shaft 73 for delivering power therefrom to the boom hoist drums 52 and 53. Opening valve 173-b delivers pressure through line 201 to the other boom clutch 122. Forward movement of knob 173 actuates valve 173-b and thus clutch 122 which effects lowering of the boom and rearward movement of knob 173 actuates valve 173-a and thus clutch 121 which effects raising of the boom.

Control knob 172 is similarly movable both fore and aft, to alternatively actuate valves 172-a and 172-b, which are associated respectively with pressure lines 202 and 203, this pair of lines being extended to the reverse clutches associated with the horizontal reverse clutch shaft 83. When the machinery which is operated from shaft 83 is conditioned to effect swing motion of the rotating base, forward movement of knob 172 operates valve 172-b and thus cylinder 129-a and thereby effects swing to the right, and rearward movement of knob 172 operates valve 172-a and thus cylinder 129 and thereby effects swing to the left. When the mechanism driven from shaft 83 is conditioned to effect the function of propel, forward movement of knob 172 operates cylinder 129-a and thereby effects propel in forward, and rearward movement of knob 172 operates cylinder 129-a and thereby effects propel backward.

The control for conditioning the units of the machine driven from the reverse shaft 83 to alternatively perform the functions of swing and propel is located on the side control stand, and comprises knob 183 which is movable in opposite directions to control a two-way valve 183-a arranged to alternatively deliver pressure through lines 204 and 205 to the opposite ends of the double-acting cylinder 145 which controls the operation of the lever or beam 143 (see Figure 5), and thereby connects the horizontal reverse clutch shaft 83 alternatively with the swing drive pinion 138 and the propel drive bevel pinion 140.

Knob 182 on the side control stand is also movable in two directions to operate the two-way valve 182-a to alternatively deliver pressure through lines 206 and 207 to the opposite ends of the double-acting cylinder 153 which is associated with the truck steering mechanism above described, and effects vertical movement of the control tube 150 (see Figure 5). Thus when the knob 183 is adjusted to "propel" position, and when knob 182 is located in its mid or neutral position, operation of knob 172 on the front control stand will then set the drive mechanism into operation and effect driving in one direction or the other. Operation of the steering control knob 182 in either direction from its neutral position will result in steering of the machine to one side or other, when the propel knob 172 is actuated, this steering being accomplished in any desired manner, preferably by effecting drive of the two crawler treads at different rates, which may be done by mechanism of the type shown in copending application Serial No. 454,792, above mentioned.

When the control 183 is adjusted to its "swing" position, knob 172 on the front control stand then provides for swing to the left or to the right. Swing motion may be arrested by operation of the swing brake 146—147 (see Figures 5 and 6) which is controlled by knob 184 on the side control stand. This knob controls the valve 184-a to deliver pressure through line 208 to the swing brake operating cylinder 148.

Knob 185 on the side control stand operates the two-way valve 185-a to alternatively deliver pressure through lines 209 and 210 to opposite ends of the cylinder 159 which is associated with the main engine clutch, to thereby provide for connection and disconnection of the power plant and the operating machinery.

In considering the control system above described, it is first noted that the control knobs 182 to 185, which are associated with the side control stand 181 are all of types which require only presetting or only occasional adjustment, for instance, to condition various units of the operating machinery to selectively perform different functions. On the other hand, all of those controls which actually effect the primary working functions of the machine are grouped together at the front of the operator's station. This group comprises knobs 171 to 174 mounted on the control stand 170, and also the foot brake pedals 176 and 177, as well as the foot accelerator 178. Maximum convenience is thereby provided in operation of the machine.

All of the controls, moreover, are readily accessible when the operator is seated. At the same time, because of the considerable elevation of the operator's station at the top of the control tower, and further because of the arrangement of windows provided in the upper portion of the control tower, even when seated, the operator has full and clear vision both upwardly and downwardly and to the sides, so that the load being handled, as well as any surrounding obstacles, can readily be observed.

According to the foregoing, a load handling machine capable of handling large and heavy loads is provided, and notwithstanding the size and weight of the machine and its various operating parts and machinery, the several working functions can be performed with ease and reliability.

I claim:

1. In a crawler type load handling machine having a rotating base carrying operating machinery, a boom and a cab structure enclosing the machinery; a control tower mounted on the base and having an operator's station therein at an elevation providing vision for the operator well above the cab structure, operator's controls for the machinery in the tower at the operator's station, with control devices operatively associated with said controls located in the tower close to but below the floor of the operator's station, and further with control connections extended downwardly from the control devices for remote control of the machinery on the base, and a deck in the tower between the floor of the operator's station and the base and providing convenient access to said control devices.

2. A construction according to claim 1 in which the control devices below the floor of the operator's station comprise fluid pressure valves, and in which the control connections comprise fluid pressure lines extended downwardly through the tower to the machinery on the base.

3. In a crawler type load handling machine having a rotating base carrying a boom mounted for upward and downward swinging movement, and carrying operating machinery, certain units of which are adapted alternatively to perform different functions; a control tower mounted on the base and having an operator's station therein offset to one side of the plane of upward and downward swinging of the boom and at an elevation providing vision for the operator well above the operating machinery, and control mechanism for the machinery including a control organ for conditioning a unit of the machinery to perform one or another function alternatively, and a control organ for regulating the operation of said unit, said two control organs being located at the operator's station and respectively positioned at a side of the station and at the front of the station.

4. A construction according to claim 3 in which the control organ for conditioning a unit of the machinery to perform one function or another is located at that side of the operator's station adjacent the plane of upward and downward swinging movement of the boom.

5. In a crawler type load handling machine having a rotating base carrying a boom mounted for upward and downward swinging movement, and further having an operator's station and carrying operating machinery, certain units of which are adapted alternatively to perform different functions; control mechanism for the machinery including a control organ for conditioning a unit of the machinery to perform one or another function alternatively, and a control organ for regulating the operation of said unit, said two control organs being located at the operator's station and respectively positioned at a side of the station and at the front of the station.

6. In a crawler type load handling machine having a rotating base carrying operating machinery, certain units of which are adapted to be conditioned to selectively perform the functions of swing and propel, and certain units of which are adapted to be conditioned to selectively steer toward the right or left; an operator's station on the rotating base, and control mechanism for the machinery including a control organ for conditioning certain units to selectively perform the functions of swing and propel, a second control organ for conditioning units to selectively steer to the right or left, and a control means for regulating the operation of said units, said two control organs being located toward a side of the operator's station and said control means being located toward the front of the operator's station.

7. In a crawler type load handling machine having a rotating base carrying a boom mounted for upward and downward swinging movement, and carrying operating machinery, certain units of which are adapted to respectively perform the functions of hoisting and boom hoisting and certain units of which are adapted to be conditioned to selectively perform the functions of swing and propel; an operator's station on the rotating base, and control mechanism for the machinery including a control organ for conditioning certain units to selectively perform the functions of swing and propel, a second control organ for regulating the operations of said last units, a third control organ for regulating hoisting, and a fourth control organ for regulating boom hoisting, said first control organ being located toward a side of the operator's station and the other three control organs being located toward the front of the operator's station.

8. In a crawler type load handling machine having a rotating base carrying a boom mounted for upward and downward swinging movement, and carrying operating machinery, certain units of which are adapted to respectively perform the functions of hoisting and boom hoisting and certain units of which are adapted to be conditioned to selectively steer toward the right or left; an operator's station on the rotating base, and control mechanism for the machinery, including a control organ for conditioning units to selectively steer toward the right or left; a second control organ for regulating the operation of said last units, a third control organ for regulating hoisting, and a fourth control organ for regulating boom hoisting, said first control organ being located toward a side of the operator's station and the other three control organs being located toward the front of the operator's station.

9. A construction according to claim 8 and further including a swing brake, with a control organ therefor located at that side of the operator's station on which the first mentioned control organ is located.

10. In a crawler type load handling machine having a rotating base carrying operating machinery and having a boom mounted on the base for upward and downward swinging movement, a control tower mounted on the base and having a floor providing an operator's station offset to one side of the plane of swinging movement of the boom and located at an elevation providing vision for the operator well above the machinery on the base, the operator's station being enclosed and provided with windows at the front thereof extended throughout an appreciable vertical distance upwardly substantially from the elevation of the floor of the operator's station to provide vision for the operator at a steeply inclined downward angle, whereby the operator may readily observe objects close to the front of the machine at the ground level, notwithstanding the considerable elevation of the operator's station.

11. In a crawler type load handling machine having a rotating base carrying operating machinery and having a boom mounted on the base, a control tower mounted on the base having a floor providing an operator's station at an elevation providing vision for the operator well above the machinery on the base, and a control stand at the front of the operator's station spaced above the station floor to provide vision for the operator at a steeply inclined forward and downward angle between the control stand and the floor, whereby the operator may readily observe objects close to the front of the machine at the ground level, notwithstanding the considerable elevation of the operator's station.

12. In a crawler type load handling machine having a rotating base carrying operating machinery and having a boom mounted on the base, a control tower mounted on the base having a floor providing an operator's station at an elevation providing vision for the operator well above the machinery on the base, the operator's station being enclosed and provided with windows at the front thereof extended throughout an appreciable vertical distance upwardly substantially from the elevation of the station floor, and a control stand at the front of the operator's station spaced above the station floor to provide vision for the operator at a steeply inclined forward and downward angle between the control stand and the floor, whereby the operator may readily observe objects close to the front of the machine at the ground level, notwithstanding the considerable elevation of the operator's station.

13. In a crawler type load handling machine having a rotating base carrying operating machinery and having a boom mounted on the base, a control tower mounted on the base having a floor providing an operator's station at an elevation providing vision for the operator well above the machinery on the base, a group of controls toward the front of the operator's station, a group of controls toward a side of the station, remote control devices located below the floor of the operator's station and actuated by the front controls, and remote control devices located above the station floor in close association with the side controls and actuated thereby.

14. In a crawler type load handling machine having a rotating base carrying operating machinery and having a boom mounted on the base, a control tower mounted on the base having a floor providing an operator's station at an elevation providing vision for the operator well above the machinery on the base, a control stand at the operator's station having a group of controls mounted thereon, and a fluid pressure remote control system interconnecting said controls and machinery on the base, said system including a fluid pressure manifold located in the control tower adjacent the operator's station.

15. A construction according to claim 14 in which said fluid pressure manifold is mounted in the control stand in close association with the controls mounted thereon.

16. In a crawler type load handling machine having an engine and a boom mounted for raising and lowering, a rotating base structure formed with a pair of side-by-side pockets divided from each other by a structural brace, a pair of boom hoist drums received in said pockets, a boom hoist drum shaft carrying said drums and journalled in the base structure, a power shaft mounted on the base above and in the region of the boom hoist drum shaft, power transmission means adapted to interconnect the power shaft and the drum shaft, and a bearing support for the power shaft mounted on said structural brace of the base structure which divides the drum pockets from each other.

17. In a crawler type load handling machine having an engine and a boom mounted for raising and lowering, a rotating base structure formed with a pair of side-by-side pockets divided from each other by a structural brace, a pair of boom hoist drums received in said pockets, a boom hoist drum shaft carrying said drums and journalled in the base structure, a power shaft mounted on the base above and in the region of the boom hoist drum shaft, and in which one of the pockets in the base structure is of sufficient dimension axially of the drum shaft to accommodate a power transmission unit in addition to the drum received therein, a power transmission unit in said pocket and operatively connected with the drum shaft and with the power shaft, and bearing supports for the power shaft one of which is mounted on said structural brace of the base structure which divides the drum pockets from each other, and the other of which is mounted on the base structure at the opposite side of the pocket in which the transmission unit is received.

WILLIAM M. HUSTON.

REFERENCES CITED

The following references are of record in the file of this patent:

UNITED STATES PATENTS

| Number | Name | Date |
|---|---|---|
| Re. 9,095 | Hall | Feb. 24, 1880 |
| D. 134,464 | Zeilman | Dec. 1, 1942 |
| D. 139,385 | Rauch | Nov. 14, 1944 |
| 508,806 | Butcher | Nov. 14, 1893 |
| 633,348 | Simmons et al. | Sept. 19, 1899 |
| 782,024 | Johnston | Feb. 7, 1905 |
| 833,748 | McGiffert | Oct. 23, 1906 |
| 1,195,461 | Greene | Aug. 22, 1916 |
| 1,750,963 | Lichtenberg | Mar. 18, 1930 |
| 1,759,406 | Jobes | May 20, 1930 |
| 1,775,435 | Lichtenberg | Sept. 9, 1930 |
| 1,869,223 | Peck | July 26, 1932 |
| 1,905,434 | Boyer | Apr. 25, 1933 |
| 1,940,616 | Wissmann | Dec. 19, 1933 |
| 2,071,135 | McGiffert et al. | Feb. 16, 1937 |
| 2,261,483 | Nickles et al. | Nov. 4, 1941 |
| 2,322,697 | Lawler | June 22, 1943 |
| 2,383,172 | Wagner et al. | Aug. 21, 1945 |

Certificate of Correction

Patent No. 2,572,029                                                      October 23, 1951

WILLIAM M. HUSTON

It is hereby certified that error appears in the printed specification of the above numbered patent requiring correction as follows:

Column 10, line 57, for "117–118" read *117–119*; column 11, line 12, for "aranged" read *arranged*; column 14, line 63, for "trough" read *through*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*